US012657011B2

(12) United States Patent
Chang et al.

(10) Patent No.: US 12,657,011 B2
(45) Date of Patent: Jun. 16, 2026

(54) MODEL DESCRIBING CONFIGURATION FIELD DEPENDENCIES TO DRIVE USER EXPERIENCE

(71) Applicant: Oracle International Corporation, Redwood Shores, CA (US)

(72) Inventors: Tuck Chang, Foster City, CA (US); Tian Ma, Richmond (CA); Zhengming Zhang, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 169 days.

(21) Appl. No.: 18/368,708

(22) Filed: Sep. 15, 2023

(65) Prior Publication Data

US 2025/0094142 A1 Mar. 20, 2025

(51) Int. Cl.
| | |
|---|---|
| *G06F 8/38* | (2018.01) |
| *G06F 9/451* | (2018.01) |
| *G06F 9/54* | (2006.01) |
| *G06F 3/01* | (2006.01) |

(52) U.S. Cl.
CPC ................ *G06F 8/38* (2013.01); *G06F 9/451* (2018.02); *G06F 9/541* (2013.01)

(58) Field of Classification Search
None
See application file for complete search history.

(56) References Cited

U.S. PATENT DOCUMENTS

| | | | | |
|---|---|---|---|---|
| 8,359,335 | B2 * | 1/2013 | Coker | G06F 9/547 |
| | | | | 707/804 |
| 9,128,975 | B2 * | 9/2015 | Leto | G06F 16/2365 |
| 11,488,042 | B1 * | 11/2022 | Chapman | G06N 7/01 |
| 11,586,643 | B2 * | 2/2023 | Fernando | G06F 16/2219 |
| 11,790,468 | B1 * | 10/2023 | Bright | G06F 3/0484 |
| | | | | 715/738 |
| 2013/0086107 | A1 * | 4/2013 | Genochio | G06F 16/26 |
| | | | | 707/769 |
| 2019/0004505 | A1 * | 1/2019 | Joshi | G05B 19/41885 |
| 2020/0126162 | A1 * | 4/2020 | Whitley | H04L 51/23 |
| 2020/0351176 | A1 * | 11/2020 | Venkiteswaran | H04L 63/10 |
| 2021/0011761 | A1 * | 1/2021 | Bills | G06Q 10/0631 |
| 2022/0179664 | A1 * | 6/2022 | Johnson | G06F 9/451 |

(Continued)

*Primary Examiner* — Toan H Vu
(74) *Attorney, Agent, or Firm* — Hickman Becker Bingham Ledesma LLP; Stephen J. Walder, Jr.

(57) ABSTRACT

The present disclosure relates to a "no code" framework for creating adapters to integrate a cloud service or other platform with a third-party service. User interface component metadata representing a user interface may be generated based at least in part on a metadata document. The metadata document may comprise metadata specifying a plurality of fields and one or more dependencies of one or more of the plurality of fields on one or more other of the plurality of fields. The user interface component metadata may comprise metadata representing a first field of the plurality of fields. An interaction with the first field in the user interface may be detected, and a second field of the plurality of fields having a dependency on the first field may be identified based at least in part on the metadata document. The user interface component metadata may be updated to comprise data representing the second field.

20 Claims, 12 Drawing Sheets

(56)                    References Cited

U.S. PATENT DOCUMENTS

2023/0169501 A1*   6/2023   Biswas ............... G06Q 20/229
                                                           705/44
2023/0315723 A1*  10/2023   Eberlein ................... G06F 8/38
                                                           707/766
2023/0393717 A1*  12/2023   Soli ....................... G06F 3/0233
2025/0068300 A1*   2/2025   Wohlstadter .......... G06F 3/0482

* cited by examiner

124

```
"name": {
  "id": "third-party-spreadsheet-editor",
  "displayName": "Spreadsheet Editor",
  "description": "A cloud-based service for editing spreadsheets",
  "version": "0.01",
  "publisherInfo": {
    //Information about the publisher of the application can be included here
  },
  "connection": {
    //Information about connecting to and authenticating with a third-party service that publishes the application
  },
  "schema": {
    //properties of each schema of the wrapper
    "actions": [
      {
        "displayName": "Insert Row",
        "description": "Inserts a new row into a worksheet",
        "url": "/insertRow",
        "input": {
          "ref": "#/schemas/insertRowSchema"
        },
        "output": {
          "schema": {
            ...
          }
        },
        "ref": "application/json",
        "ref": "#/schemas/insertRowOutput"
      }
    ],
    "configuration": [
      {
        "name": "selectSpreadsheet",
        "displayName": "Select Spreadsheet",
        "description": "Select from a list of spreadsheets",
        "type": "combo_box",
        "urn": "thirdpartied:fspreadsheets"
      },
      {
        "name": "selectWorksheet",
        "displayName": "Select Worksheet",
        "description": "Select from a list of worksheets",
        "type": "combo_box",
        "urn": "thirdpartied:fselectWorksheets"
      },
      {
        "name": "spreadsheet": {
          "value": {}
        }
      }
    ]
  }
}
```

```
                                               209b
  },
  "validateDataAction": {
      "displayName": "Validate Data",
      "description": "Validate data based on selected criteria",
      "urn": "flow:validateDataFlow",
      "configuration": [
          {
                                               214c
              "name": "selectCriteria",
              "displayName": "Select Criteria",
              "description": "Select from a list of criteria to apply",
              "type": "DROPDOWN_LIST",
              "urn": "flow:selectCriteriaFlow"
              "keys": [
                  {
                      "keyName": "textContains",
                      "displayName": "Text Contains"
                  },
                  {
                      "keyName": "isInColumn",
                      "displayName": "Is in Column"
                  }
              ]
          },
          {
                                               214d
              "name": "enterText",
              "displayName": "Enter Text",
              "description": "",
              "type": "TEXT_BOX",
              "dependencies": {
                  "selectCriteria": {           216
                      "values": ["textContains"]
                  }
              }
          },
          {
                                               214e
              "name": "selectColumn",
              "displayName": "Select Column",
              "description": "Select from a list of columns",
              "type": "COMBO_BOX",
              "dependencies": {
                  "selectCriteria": {            218
                      "values": "flow:getListOfColumnsFlow"
                  }
              }
          }
      ]
  },
```

*FIG. 2B*

```
                                    208
flows {
    "insertRowFlow" {
            //implementation of the insertRowFlow          211
    },
    "sheetSchemaFlow" {
        //implementation of the sheetSchemaFlow          211
    },
    "getListOfSpreadsheetsFlow" {
        //implementation of the getListOfSpreadsheetsFlow          211
    },
    "getListOfWorksheetsFlow" {
        //implementation of the getListOfWorksheetsFlow          211a
    },
    "validateDataFlow" {
        //implementation of the validateDataFlow          211
    },
    "selectCriteriaFlow" {
        //implementation of the selectCriteriaFlow          211
    },
    "getListOfColumnsFlow" {
        //implementation of the getListOfColumnsFlow          211b
    }
    }
}
```

*FIG. 2C*

MODEL DESCRIBING CONFIGURATION FIELD DEPENDENCIES TO DRIVE USER EXPERIENCE

TECHNICAL FIELD

The present disclosure relates to adapters for integrating a cloud service with applications hosted by third-party services.

BACKGROUND

Applications and services often allow users to configure settings, preferences, and other options that affect the functionality of those applications and services. Configuration may involve a user interacting with a user interface to select certain values for fields that correspond to those various options. In some situations, the particular value selected for one field may dictate which fields are subsequently presented and what values that a user may select for those fields. For example, when selecting preferred options for a car that a user wants to purchase, the user may need to select a "premium" trim package before the user is permitted to select an option for "heated seats." That is, if the user selects a "standard" trim package, the "heated seats" option may not be available.

One similar use case is the configuration of adapters, which may be used to integrate cloud services with third-party application. The development of an adapter may include modeling how a user will interact with various fields in a user interface to configure the adapter and actions of the adapter, including how these various fields are related. The configuration of an adapter could be modeled using code.

But using code to model relationships between fields may cause several issues. For example, using code may make an adapter's implementation difficult to understand and likewise difficult to update later. And even if an adapter is coded efficiently at the outset, that code may be difficult to update with new or different behaviors. As another example, introducing coded adapters to an enterprise cloud environment may pose security risks, especially if those adapters are coded by partners or other third parties outside of that enterprise. Those adapters could include malicious or suboptimal code that may affect the operation of the enterprise cloud environment and related services.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIGS. 2A-C depict an example of a metadata document;

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

The present disclosure relates to a "no code" framework for creating adapters to integrate a cloud service or other platform with a third-party service.

Disclosed embodiments mitigate issues with coded adapters by allowing a developer to define an adapter using a metadata document, without writing code. A metadata document may include metadata that models the adapter's actions, fields, dependencies among those fields, and other properties of the adapter. An actions component of a metadata document may define a set of interactions that the adapter will expose to a user. These interactions may involve one or more user interface fields with which a user will interact to configure the corresponding action.

To that end, the actions component of the metadata document may include one or more dependency clauses that model the relationships between fields. A dependency clause may declare any dependencies that exist between the various fields of an adapter. A dependency clause may describe how a child field's value and/or visibility are dependent on a parent field selection. A dependency clause may specify that a corresponding field does not become visible to a user until a specified parent field has been selected. In some examples, a dependency clause may further require that a parent field has a particular value before the child dependency is visible to the user. This value may be a predetermined value, or it may be based on a value returned by dynamic query to a third-party service.

System Overview

Figure 1:
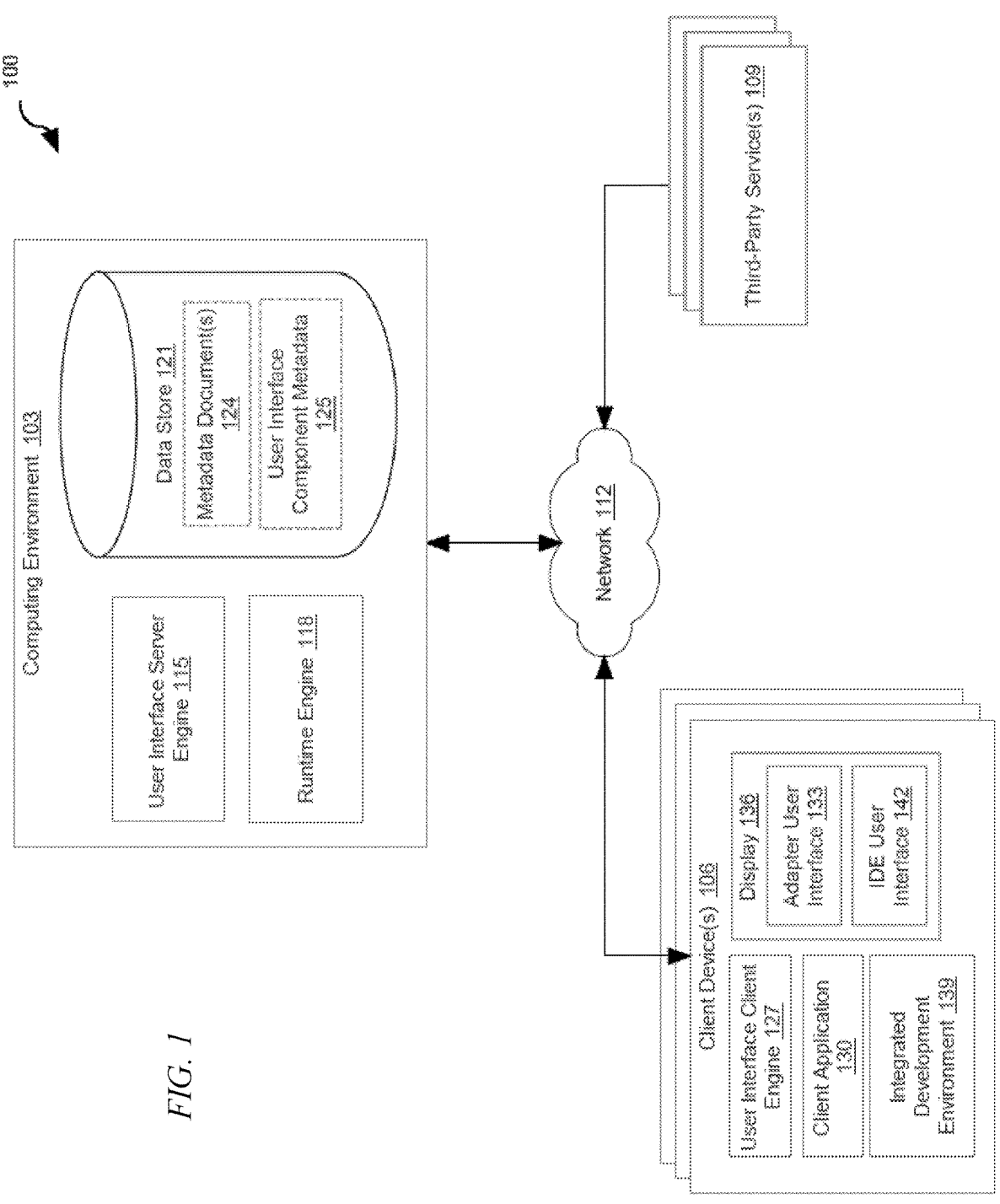
FIG. 1 illustrates a block diagram depicting an example of a network environment.

FIG. 1 illustrates a block diagram depicting an example of a network environment 100 according to various embodiments of the present disclosure. The network environment 100 may include a computing environment 103, one or more client devices 106, one or more third-party services 109, and potentially other components in communication via a network 112.

The network 112 includes the Internet, intranets, extranets, wide area networks (WANs), local area networks (LANs), wired networks, wireless networks, other suitable networks, or any combination of two or more such networks. The networks may include satellite networks, cable networks, Ethernet networks, and other types of networks.

The computing environment 103 may be a computing environment that is operated by an enterprise, such as a business or other organization. The computing environment 103 may include a computing device, such as a server computer, that provides computing capabilities. Alternatively, the computing environment 103 may employ multiple computing devices that are arranged in one or more server banks or computer banks. In one example, the computing devices may be located in a single installation. In another example, the computing devices for the computing environment 103 may be distributed among multiple different geographical locations. In one case, the computing environment 103 may include multiple computing devices that together may form a hosted computing resource or a grid computing resource. In addition, the enterprise computing environment 103 may operate as an elastic computing resource where the allotted capacity of computing-related resources, such as processing resources, network resources, and storage resources, may vary over time. In other examples, the enterprise computing environment 103 may include or be operated as one or more virtualized computer instances that may be executed to perform the functionality that is described herein.

Various applications or other functionality may be executed in the enterprise computing environment 103. Components executed in the computing environment 103 may include a user interface engine 115, a runtime engine 118, and other applications, services, processes, systems, engines, or functionality not discussed in detail herein.

In addition, various data may be stored in a data store 121 that may be accessible to the enterprise computing environment 103. The data store 121 may be representative of a plurality of data stores 121. The data stored in the data store 121 may be associated with the operation of the various applications or functional entities described below. Data stored in the data store may include, for example, metadata document(s) 124 and user interface component metadata 125.

A metadata document 124 may include metadata that models configuration fields in an adapter and their dependencies on one another in a way that guides a user to a valid configuration. The metadata document 124 may model various characteristics of an adapter including, for instance, information about the adapter, how the adapter connects to a third-party service 109, schemas of the adapter, and actions that will be exposed to a user of the adapter. In addition, the metadata document 124 may define the configuration of an action, including one or more associated fields that could be exposed to a user and dependencies among those fields. A dependency may specify that the values and visibility of a field depend on the selection of a specified parent field. Thus, dependencies allow the metadata document 124 to model a hierarchical relationship among the fields of an adapter to ensure a valid configuration, as discussed in more detail below.

The user interface component metadata 125 may include metadata generated by the user interface server engine 115 that represents a user interface for configuring an adapter associated with a metadata document 124. The user interface component metadata 125 may represent various components of the user interface, including, for instance fields, text, and other graphical control components.

The user interface server engine 115 may be executed to process metadata documents 124 to generate user interface component metadata 125 that may be rendered as a user interface by the client device 106. When the user interface server engine 115 parses the metadata document 124, the user interface server engine 115 may identify dependencies for each field in the metadata document 124 and thereby determine what parent fields are selected before the field may become visible. As an example, the user interface server engine 115 may construct a tree data structure beginning with leaf nodes representing child fields on which no other fields depend, and ending with parent nodes representing parent fields with no dependencies. The user interface server engine 115 may then generate user interface component metadata 125 including one or more fields that, based on dependencies, may be visible to a user, as well as other user interface components. The user interface server engine 115 may provide the user interface component metadata 125 to the client device 106.

The user interface server engine 115 may detect a selection of one or more fields from the user interface by, for example, receiving an indication of the interaction from the client device 106. Upon detecting the selection, the user interface server engine 115 may, using the metadata document 124, determine how to modify the user interface component metadata 125 based on the metadata document 124. If the selection involves one or more static values, the user interface server engine 115 may proceed with modifying the user interface based on the selection. If the selection involves one or more dynamic values, the user interface server engine 115 may request the dynamic values from the runtime engine 118. In response, the user interface server engine 115 may receive one or more values from the runtime engine 118. The user interface server engine 115 may update the user interface component metadata 125 based on the selection and any corresponding values (static or dynamic) and provide the updated user interface component metadata to the client device 106.

The runtime engine 118 may be executed to query the third-party services 109 to obtain dynamic values. The runtime engine 118 may receive a request for one or more dynamic values for a selected parent field from the user interface server engine 115. The runtime engine 118 may then identify a flow (defined in the metadata document 124) associated with the selected parent field and execute the flow. A flow may mean the functions, states, transitions, parameters, data filters, and other technical components that are used to perform some function related to an action. Executing a flow may include generating and providing a query for one or more dynamic values to the third-party service 109. The runtime engine 118 may receive the one or more dynamic values from the third-party service 109 and provide the one or more dynamic values to the user interface server engine 115.

The client device 106 may represent multiple client devices 106 coupled to the network 112. The client device 106 may include a processor-based system, such as a computer system, that may include a desktop computer, a laptop computer, a personal digital assistant, a cellular telephone, a smartphone, a set-top box, a music player, a tablet computer system, a game console, an electronic book reader, or any other device with like capability. The client device 106 may also be equipped with networking capability or networking interfaces, including a localized networking or communication capability, such as a near-field communication (NFC) capability, radio-frequency identification (RFID) read or write capability, or other localized communication capability.

In addition, the client device 106 may be configured to execute various applications, such as the user interface client engine 127 and a client application 130. The user interface client engine 127, client application 130, an integrated development environment 139, and potentially other applications may access network content served up by the computing environment 103 or other servers, thereby rendering an adapter user interface 133 on a display 136, such as a liquid crystal display (LCD), touch-screen display, or other type of display device. To this end, the client application 130 may include a browser or a dedicated application, and an adapter user interface 133 may include a network page, an application screen, or other interface. Further, the client application 130 may include device email applications, management applications, enterprise applications, social networking applications, word processors, spreadsheet applications, media viewing applications, or other applications.

The user interface client engine 127 may be executed to generate data representing an adapter user interface 133 for viewing by a user. The user interface client engine 127 may receive user interface component metadata 125 from the user interface server engine 115. Then, based on the user interface component metadata 125, the user interface client engine 127 may generate data representing the adapter user interface 133 including one or more fields or other components for configurating an adapter. The user interface client engine 127 may provide the data representing the adapter user interface 133 to the client application 130 for rendering in a display 136 of the client device 106. In addition, the user interface client engine 127 may receive selections of one or more fields of the adapter user interface 133 and provide indications of those selections to the user interface server engine 124. The user interface client engine 127 may receive updated user interface component metadata 125, generate data representing an updated adapter user interface 133 based on this updated user interface component metadata 125, and provide the data representing the updated adapter user interface 133 to the client application 130 for rendering in the display 136 of the client device 106.

The client application 130 may represent various types of applications executable by the client device 106. For example, the client application 130 could be a web browser, a productivity application, or other application. The client application 130 may render the adapter user interface 133 and the integrated development environment user interface 142 in the display 136.

The integrated development environment 139 may be executed to provide tools to write, edit, validate, and preview metadata documents 124. The integrated development environment 139 may render an integrated development environment user interface 142 in the display 136. The integrated development environment 139 may provide a text editor enabling a user to write and edit the metadata in a metadata document 124. The integrated development environment 139 may, for example, identify errors in and validate a metadata document 124 with respect to one or more syntax and/or semantic rules. The integrated development environment 139 may notify users of those errors using the integrated development environment user interface 142, permit the user to validate the metadata document 124 with respect to those rules, and permit the user to preview at least a portion of the metadata document 124 in a mock user interface. In some implementations, a client device 106 may not include the integrated development environment 139, such as if a user of the client device 106 is an end-user of an adapter rather than a developer of the adapter.

The third-party service(s) 109 may represent cloud services that provide access to various software applications hosted by the third-party services 109. A third-party service 109 may provide access to an application over the network 112 to users of client devices 106. Developers may construct adapters to integrate other cloud services or platforms with the applications provided by the third-party service 109. The third-party service 109 may respond to queries from the runtime engine 118 by, for example, providing one or more dynamic values.

Metadata Documents

FIGS. 2A-C depict an example of a metadata document 124. In this example, the metadata document 124 includes a JSON-based language to model the configuration of an adapter, but any similar text-based data representation format may be used. The metadata document 124 may comprise several different components, including an information component 202, a connection component 204, a schema component 206, an actions component 207, a flows component 208 and potentially other components.

The information component 202 may comprise basic information about an adapter including, for example, the name or other identifying information for the adapter, a description of the adapter, version information for the adapter, information about an application associated with the adapter, information regarding the adapter's publisher, and other similar information. The connection component 204 may define how the adapter may connect to a third-party service 109. For example, when the adapter involves calling a third-party application programming interface (API), the connection component 204 may include data used to authenticate with the third-party API or other information used to meet any security policies implemented by the third party. The schema component 206 may model a contract exposed by the third-party service, including various objects and their properties. The actions component 207 may define a set of actions 209 to be exposed to a user of the client device 106 via a user interface. The flows component 208 may define a set of flows 211 that are used to implement actions and fields. A flow 211 may mean the functions, states, transitions, parameters, data filters, and other technical components that are used to perform some function related to an action 209.

For each action 209, the actions component 207 may include, for example, the action 209 name, a display name of the action 209, a description of the action 209, schema(s) that are represented for the action 209, inputs used and outputs returned by the action 209, any flow 211 used to implement the action, and configuration of the action. An action's configuration may define one or more fields 214 corresponding to the action, including, for example, a name of the field 214, a display name of the field 214, a description of the field 214, a type of the field 214 (e.g., radio button, dropdown list, text box, combo box, etc.), whether the field 214 is required, any flow 211 used to implement the field, one or more keys associated with the field 214, and a dependency clause 216 declaring any dependencies of the field 214.

A dependency clause 216 may specify that a corresponding child field depends on the selection of a parent field. Thus, a dependency clause 216 may declare that a particular child field may not be visible to a user until its dependency on a parent field has been satisfied. A dependency clause 216 may be declared within metadata representing a child field to identify the parent field from which the child field depends. A dependency clause 216 may enable the selection of a parent field to determine the values and visibility of a child field. Thus, dependencies allow the metadata document 124 to model a hierarchical relationship for adapter configuration to ensure a valid end state. As an alternative to declaring dependencies in a dependency clause 216, a child field's dependency on a parent field could be indicated by nesting the child field within the parent field in the metadata document 124.

Field Dependencies and Value Dependencies

The relationships between fields 214 may be modeled using field dependencies and value dependencies. In a field dependency, the selection of a parent field determines the values and visibility of a child field. Any value that is selected for a parent field may allow the child field to become visible to a user.

As an example of a field dependency, suppose that an adapter for a third-party, cloud-based spreadsheet editor provided by a third-party service 109 supports an action to insert a row into a spreadsheet. When this "Insert Row" action 209a is being configured by a user of a client device 106, an adapter user interface 133 may present a "Select Spreadsheet" field 214a that prompts the user to select a spreadsheet (i.e., a workbook comprising multiple work-sheets) into which the row will be inserted. The user's selection of a spreadsheet determines that a "Select Work-sheet" field 214b becomes visible to the user in the adapter user interface 133. The "Select Worksheet" field 214b is therefore a child field of the parent field "Select Spread-sheet" 214a. The visibility of the "Select Worksheet" field 214b depends on the selection of any spreadsheet from the "Select Spreadsheet" field 214a, rather than on the selection of one particular spreadsheet. Thus, in the metadata docu-ment 124, the dependency clause 216 for the "Select Work-sheet" field 214b may declare a dependency on the "Select Spreadsheet" field 214b, without specifying any values in this dependency declaration.

In a value dependency, one or more values of a parent field determine the visibility and field values of one or more child fields. Thus, a child field may become visible only when a value selected for the parent field matches one of the values declared in the dependency clause 216. A dependency clause 216 may include one or more dependency values to indicate that it has a value dependency on a parent field, or the dependency clause 216 may omit values to indicate that it has a field dependency on a parent field.

A value dependency may be based on static values or on dynamic values. A static value may be a certain, predeter-mined value specified in an array of dependency values in a dependency clause 216. A dynamic value may be a value returned by the execution of a flow 211 associated with a parent field, which may include the runtime engine 118 querying a third-party service 109 to obtain the value. The flow 211 may be specified as a dependency value in a dependency clause 216.

As an example of a value dependency using static values, suppose that the spreadsheet adapter discussed above sup-ports an action to validate data in a cell—that is, to deter-mine whether the data in the cell satisfies a specific rule or criterion. When configuring the "Validate Data" action 209b, a user of a client device 106 may be presented with an adapter user interface 133 that includes a "Select Criteria" field 214c. The "Select Criteria" field 214c prompts a user to select a rule for validating the data in one or more cells—for instance, a list of dates (e.g., 11/14/2014, 8/19/2016, 11/29/2019, etc.). The "Select Criteria" field 214c may therefore present the user with several options correspond-ing to data validation rules.

One option in the "Select Criteria" field 214c could be labeled "Text Contains" and validate the list of dates based on whether they contain a specified value. If the user selects the "Text Contains" option, the user may be presented with an "Enter Text" field 214d in which the user enters "2014"—to check whether the list of dates includes the value "2014." The "Enter Text" field 214d therefore has a value depen-dency on the "Select Criteria" field 214c that is based on selection of the "Text Contains" value. Thus, the depen-dency clause 216 for the "Enter Text" field 214d may declare that it depends on the "Select Criteria" field 214c and include "Text Contains" in an array of dependency values.

As an illustrative example of a value dependency based on dynamic value, consider again the spreadsheet adapter and its "Select Criteria" field 214c. Another option of the "Select Criteria" field 214c could be labeled "Is in Column" and validate the list of dates based on whether they are found in a selected column of a worksheet. If the user selects the "Is in Column" option, the user may be presented with a "Select Column" field 214e, and the user could select a column labeled "Employee Start Date" to check whether each of the dates may be found in that column. The "Select Column" field 214e therefore has a value dependency on the "Select Criteria" field 214c that is based on the value returned by executing a "getListOfColumns" flow 211a that obtains a list of columns in a worksheet from a third-party service 109. Thus, the dependency clause 216 for the "Select Column" field 214e may declare that it depends on the "Select Criteria" field 214c and include "flow: getListOfCol-umnsFlow" as a dependency value.

Adapter User Interface

Figure 3A:
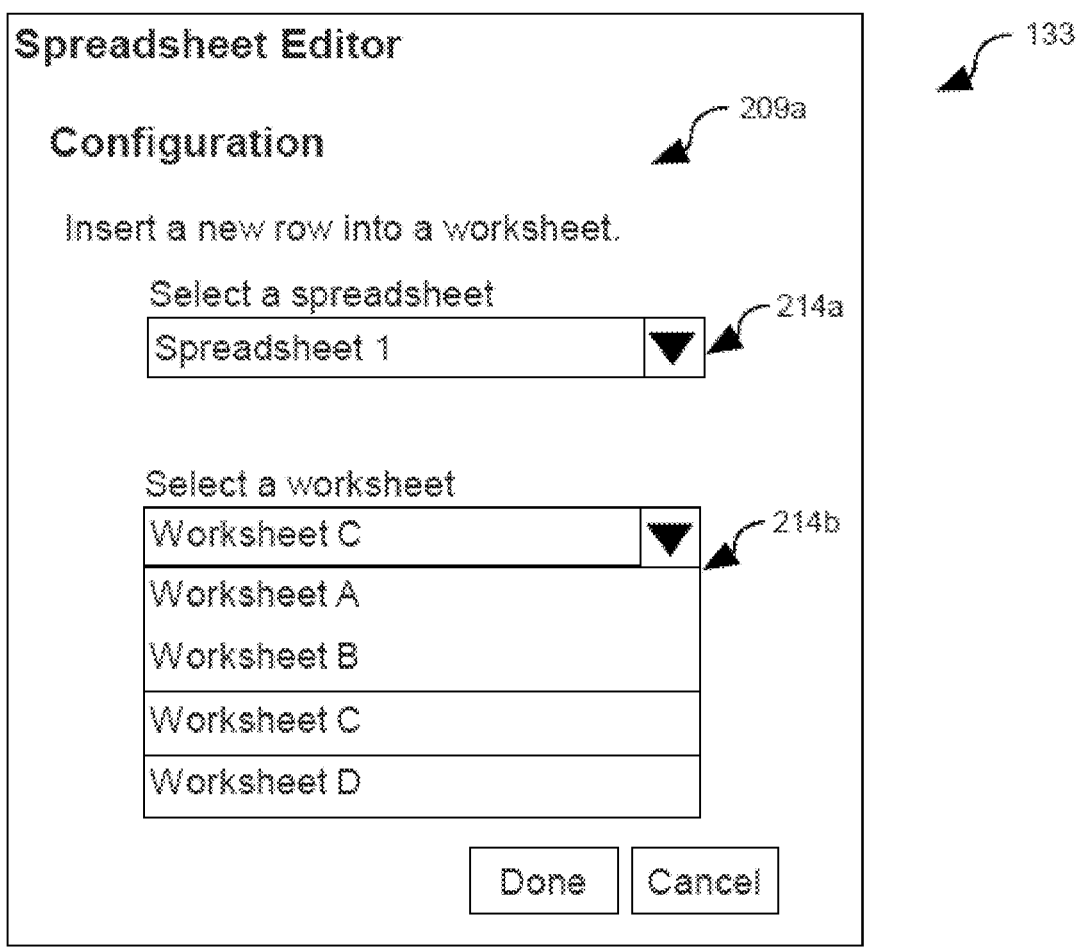
FIGS. 3A-C show examples of an adapter user interface generated by a user interface client engine and rendered by a client application in a display a of a client device.
Figure 3B:
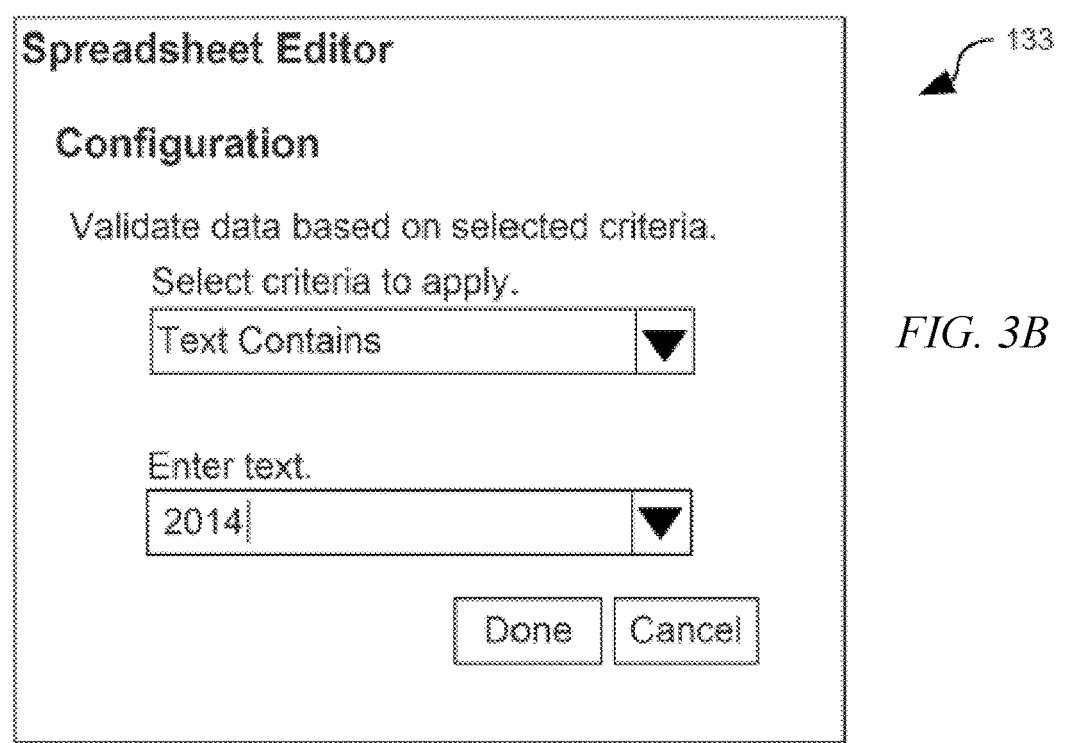
Figure 3C:
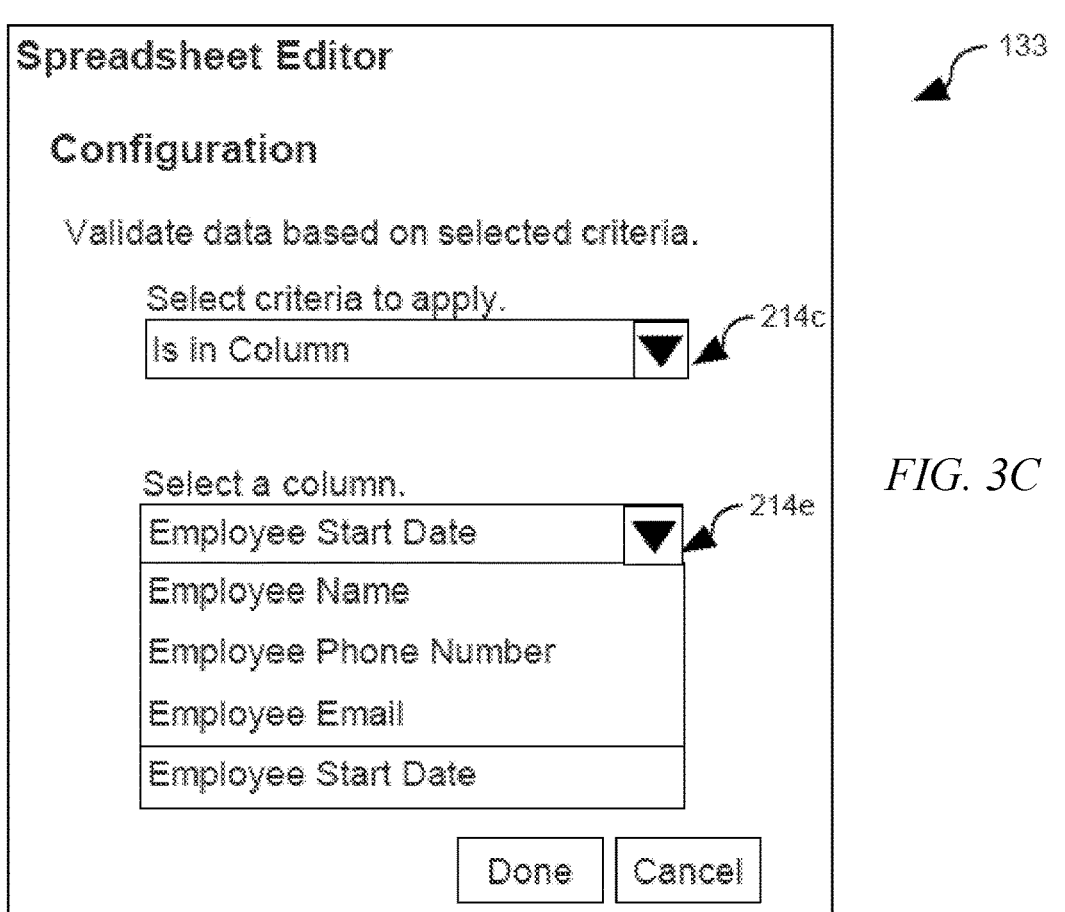

FIGS. 3A-C show examples of an adapter user interface 133 generated by the user interface client engine 127 and rendered by the client application 130 in a display 136 of the client device 106. The adapter user interface 133 as shown in FIGS. 3A-C is merely an example, however. The user interface client engine 127 may generate any type or con-figuration of user interface that correctly represents the user interface component metadata 125. In fact, users of different client devices 106 could configure the user interface client engine 127 to render a user interface that is suitable to that user's requirements or desires.

In the example of FIG. 3A, the adapter user interface 133 shows configuration of an "Insert Row" action 209a. The adapter user interface 133 includes a "Select Spreadsheet" field 214a, which a user of the client device 106 used to select "Spreadsheet 1." In response to this selection, the user interface client engine 127 notified the user interface server engine 115 of the selection of the "Select Spreadsheet" field 214a. The user interface client engine 127 then received user interface component metadata 125 from the user interface server engine 127. The user interface client engine 127 has used the user interface component metadata 125 to generate data representing an updated adapter user interface 133 that reflects selection of the "Select Spreadsheet" field 214a, which the client application 130 has rendered in the display 136. In particular, selection of the "Select Spreadsheet" field 214a has enabled a "Select Worksheet" field 214b to become visible in the adapter user interface 133. The "Select Work-sheet" field 214b has become visible because of its field dependency on the "Select Spreadsheet" field 214a. The adapter user interface 133 shows the user in the process of selecting "Worksheet C" for the "Select Worksheet" field 214b.

In the example of FIG. 3B, the adapter user interface 133 shows configuration of a "Validate Data" action 209b. The adapter user interface 133 includes a "Select Criteria" field 214c, which a user of the client device 106 has used to select a "Text Contains" option. In response to this selection, the user interface client engine 127 notified the user interface server engine 115 of the selection of "Text Contains" from the "Select Criteria" field 214c. The user interface server engine 115 then generated updated user interface component metadata 125 based on the selection. The user interface client engine 127 then received user interface component metadata 125 from the user interface server engine 115. The user interface client engine 127 has used the user interface component metadata 125 to generate data representing an updated adapter user interface 133 that reflects selection of "Text Contains" from the "Select Criteria" field 214c, which the client application 130 has rendered in the display 136. In particular, selection of "Text Contains" from the "Select Criteria" field 214c has enabled an "Enter Text" field 214d to become visible in the adapter user interface 133. The "Enter Text" field 214d has become visible because of its value dependency on the "Select Criteria" field 214c, which is based on the value "Text Contains" being selected for the "Select Criteria" field 214c. The adapter user interface 133 shows that the user has entered the string "2014" in the "Enter Text" field 214d.

In the example of FIG. 3C, the adapter user interface 133 shows configuration of the "Validate Data" action 209b. The adapter user interface 133 includes a "Select Criteria" field 214c, which a user of the client device 106 has used to select an "Is in Column" option. In response to this selection, the user interface client engine 127 notified the user interface server engine 115 of the selection of "Is in Column" from the "Select Criteria" field 214c. The user interface server engine 115 then caused the runtime engine 118 to obtain a list of columns in a worksheet from the third-party service 109 by executing a "getListOfColumnsFlow" 211b. Then, the user interface server engine 115 generated updated user interface component metadata 125 based on the selection and the list of columns from the third-party service 115. Upon receiving the updated user interface component metadata 125 from the user interface server engine 115, the user interface client engine 127 generated data representing an updated adapter user interface 133, which the client application 130 has rendered in a display 136 of the client device 106. The updated adapter user interface 133 includes a "Select Column" field 214e populated by the list of columns that was received from third-party service 109. The selection of "Is in Column" from the "Select Criteria" field 214c has enabled the "Select Column" field 214e to become visible because of its value dependency on the "Select Criteria" field 214c. The adapter user interface 133 shows in the process of selecting "Employee Start Date" from the "Select Column" field 214e.

Integrated Development Environment

Figure 4A:
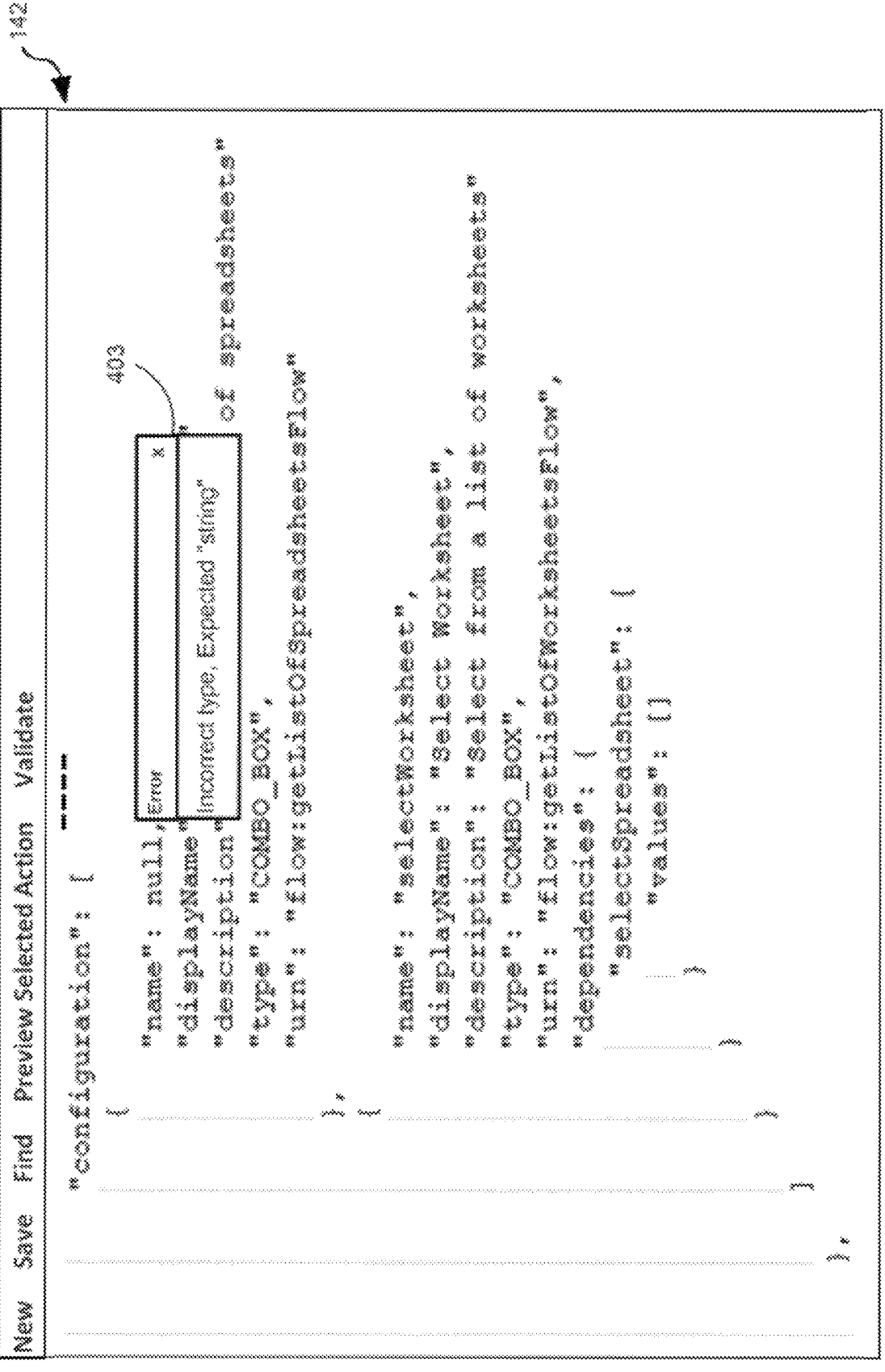
FIGS. 4A-C are examples of an integrated development environment user interface depicting an integrated development environment.
Figure 4B:
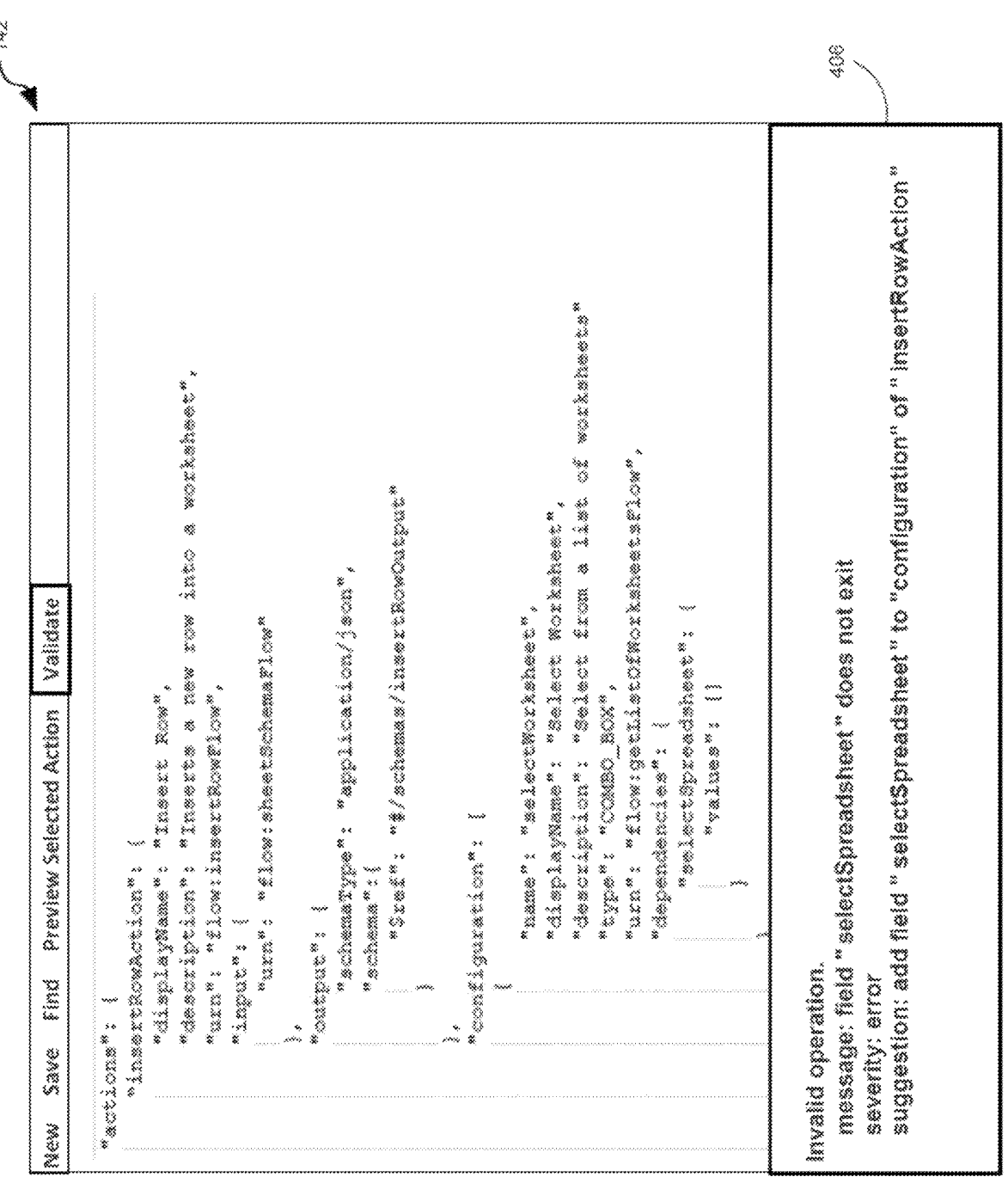
Figure 4C:
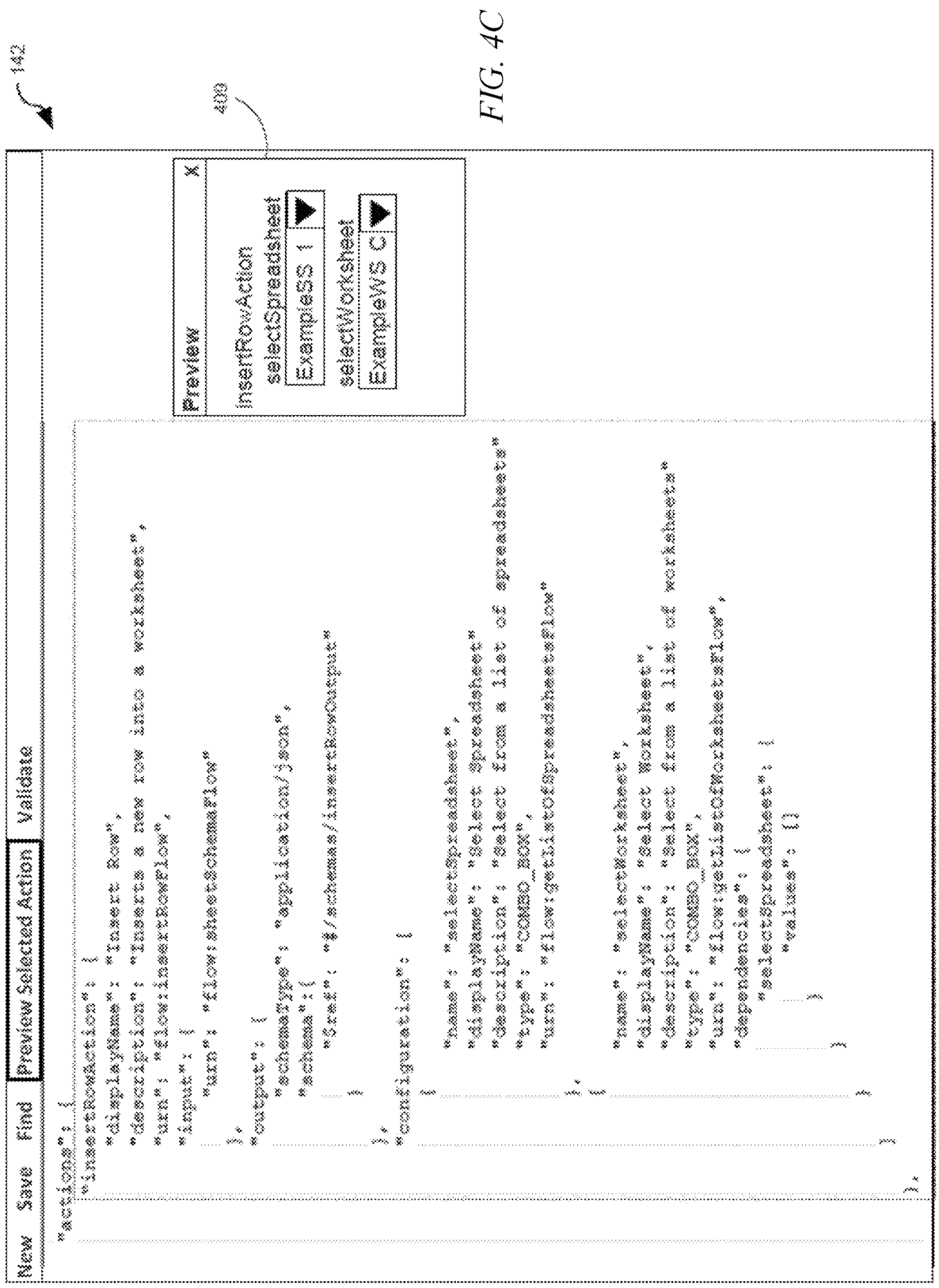

FIGS. 4A-C are examples of an integrated development environment user interface 142 depicting an integrated development environment 139. The integrated development environment 139 is an application that provides tools to write, edit, validate, and preview metadata documents 124. The integrated development environment 139 provides a text editor enabling a user to write and edit the metadata in a metadata document 124.

In the example of FIG. 4A, the integrated development environment 139 includes an error window 403 to notify the user of a syntax error within the metadata document 124. The integrated development environment 139 may identify errors within the metadata document 124 by using one or more syntax rules to determine whether metadata from the metadata document 124 is syntactically well-formed. The one or more syntax rules may dictate how the metadata from the metadata document 124 should be structured and written to valid for processing by the user interface server engine 115. The error window 403 may identify the syntax error, as well as indicating how the malformed metadata violated a relevant syntax rule. The integrated development environment 139 may also indicate which portion of the metadata document 124 caused the error.

In the example of FIG. 4B, the integrated development environment 139 includes a validation window 406 notifying a user of a semantic error within the metadata document 124. The integrated development environment 139 may validate metadata from the metadata document 124 with respect to one or more semantic rules. The integrated development environment 139 may thereby determine whether the metadata from the metadata document 124 is semantically well-formed. That is, the integrated development environment 139 may determine whether the metadata is logically and functionally correct and will produce expected results when processed by the user interface server engine 115. The validation window 406 may identify the semantic error, indicate how the semantic error was violated, and potentially indicate how the error may be corrected.

In the example of FIG. 4C, the integrated development environment 139 includes a preview pop-up window 409 showing a preview of a user interface for configuring a selected action 209 from the metadata document 124. When a user selects a portion of the metadata document 124, the user may choose to preview the functionality of that metadata in the preview window 409. The preview window 409 may show, for instance, a mock wireframe rendering of a user interface corresponding to the selected portion of the metadata document 124, as it would be generated by the user interface server engine 115 and/or user interface client engine 127. This may allow a user to interact with the mock user interface to perform the functionality of the selection portion of the metadata document 124.

User Interface Server Engine

Figure 5:
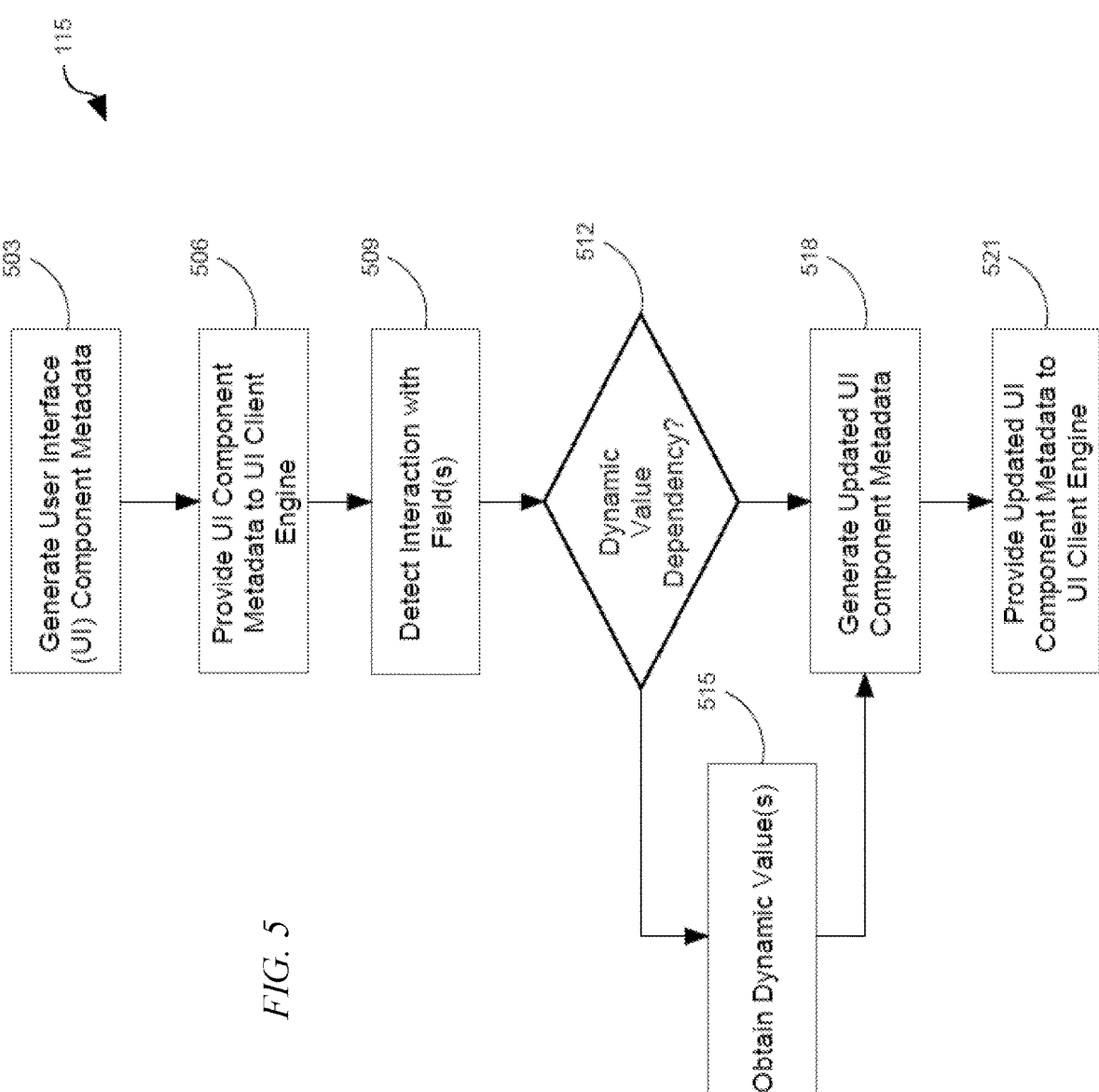
FIG. 5 is a flow diagram that depicts an example of the operation of a portion of a user interface server engine.

FIG. 5 is a flow diagram that depicts an example of the operation of a portion of the user interface server engine 115, in an embodiment. The flow diagram of FIG. 5 provides merely an example of the many different types of functional arrangements that may be employed to implement the operation of the depicted portion of the user interface server engine 115. As an alternative, the flow diagram of FIG. 5 may be viewed as depicting an example of elements of a method implemented within the networked environment 100.

At step 503, the user interface server engine 115 generates user interface component metadata 125 based on a metadata document 124. The user interface component metadata 125 may represent an adapter user interface 133 for configuring an adapter defined by the metadata document 124. The adapter user interface 133 may include one or more fields defined by metadata from the metadata document 124. A user of the client device 106 may select the one or more fields to configure various options of the adapter. Each of the one or more fields may have a dependency on another field, such that selection of the other field may affect its visibility in the adapter user interface 133.

In some implementations, the user interface server engine 115 determines which fields to include in the user interface component metadata 125 by constructing a tree data structure. For example, when parsing the metadata document 124 the user interface server engine 115 may identify those child fields of the one or more fields (i.e., fields having a dependency on another field) on which no other field depends. The user interface server engine 115 may designate those child fields as leaf nodes in the tree data structure. The user interface server engine 115 may then include the parent fields of those leaf child fields as nodes in a higher level of the tree data structure, and so on until the user interface server engine 115 identifies those fields without dependencies on another field. Starting from those highest nodes, the user interface server engine 115 may then generate the user interface component metadata 125 by traversing the tree data structure downwards, thereby determining which fields should be included in the adapter user interface 133 and which fields should not be visible because of unsatisfied dependencies. This determination may be reflected in the user interface component metadata 125.

At step 506, the user interface server engine 115 provides the user interface component metadata 125 to the user interface client engine 127. The user interface client engine 127 may be an application executing on the client device 106. The user interface client engine 127 may generate the adapter user interface 133 based on the user interface component metadata 125 for rendering by a client application 130 in a display 136 of the client device 106.

At step 509, the user interface server engine 115 detects an interaction with one or more fields in the adapter user interface 133. For example, the user interface server engine 115 may receive a notification or other indication of the selection from the user interface client engine 127. The selection may include the user interacting with the one or more selected fields in the adapter user interface 133 to choose values for the one or more selected fields (e.g., by choosing among a set of options or by entering value in a text box).

At step 512, the user interface server engine 115 determines whether any field identified in the metadata document 124 has a value dependency on the one or more selected fields that is based on a dynamic value. The user interface server engine 115 may identify fields having dependencies on the one or more selected fields. In some implementations, the user interface server engine 115 may make this determination using the tree data structure constructed at step 503. Fields having field dependencies are those without values declared in their dependency clauses 216. On the other hand, the user interface server engine 115 may identify fields having value dependencies based on their dependency clauses 216 declaring one or more values—either one or more predetermined values or a call to a flow 211 defined in the metadata document 124. Those value dependencies that call a flow 211 are by consequence based on a dynamic value. Thus, a dynamic value may include a value that is based at least in part on a query to a third-party service 109, which is triggered by execution of the corresponding flow 211. If there is at least one field having a value dependency based on a dynamic value, execution may proceed to step 515. Otherwise, execution may proceed to step 518.

At step 515, the user interface server engine 115 may obtain the one or more dynamic values from the runtime engine 518. The user interface server engine 115 (or potentially the runtime engine 118 itself) may execute a flow 211 corresponding to the value dependency. The user interface server engine 115 may request that the runtime engine 118 query the third-party service 109 for the one or more dynamic values. The runtime engine 118 may provide the query to the third-party service 109, receive the one or more dynamic values in return, and provide the one or more dynamic values to the user interface server engine 115. Execution may then proceed to step 521.

At step 518, the user interface server engine 115 generates updated user interface component metadata 125. The user interface server engine 115 may include any fields having field dependencies on the one or more selected fields. The user interface server engine 115 may also include any fields having value dependencies on the one or more selected fields if those value dependencies were satisfied by a value selected for the one or more selected fields.

At step 521, the user interface server engine 115 provides the updated user interface component metadata 125 to the user interface client engine 127. The user interface client engine 127 may generate an updated adapter user interface 133 using the updated user interface component metadata 125, which may be rendered in the display 136 of the client device 106 by the client application 130.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
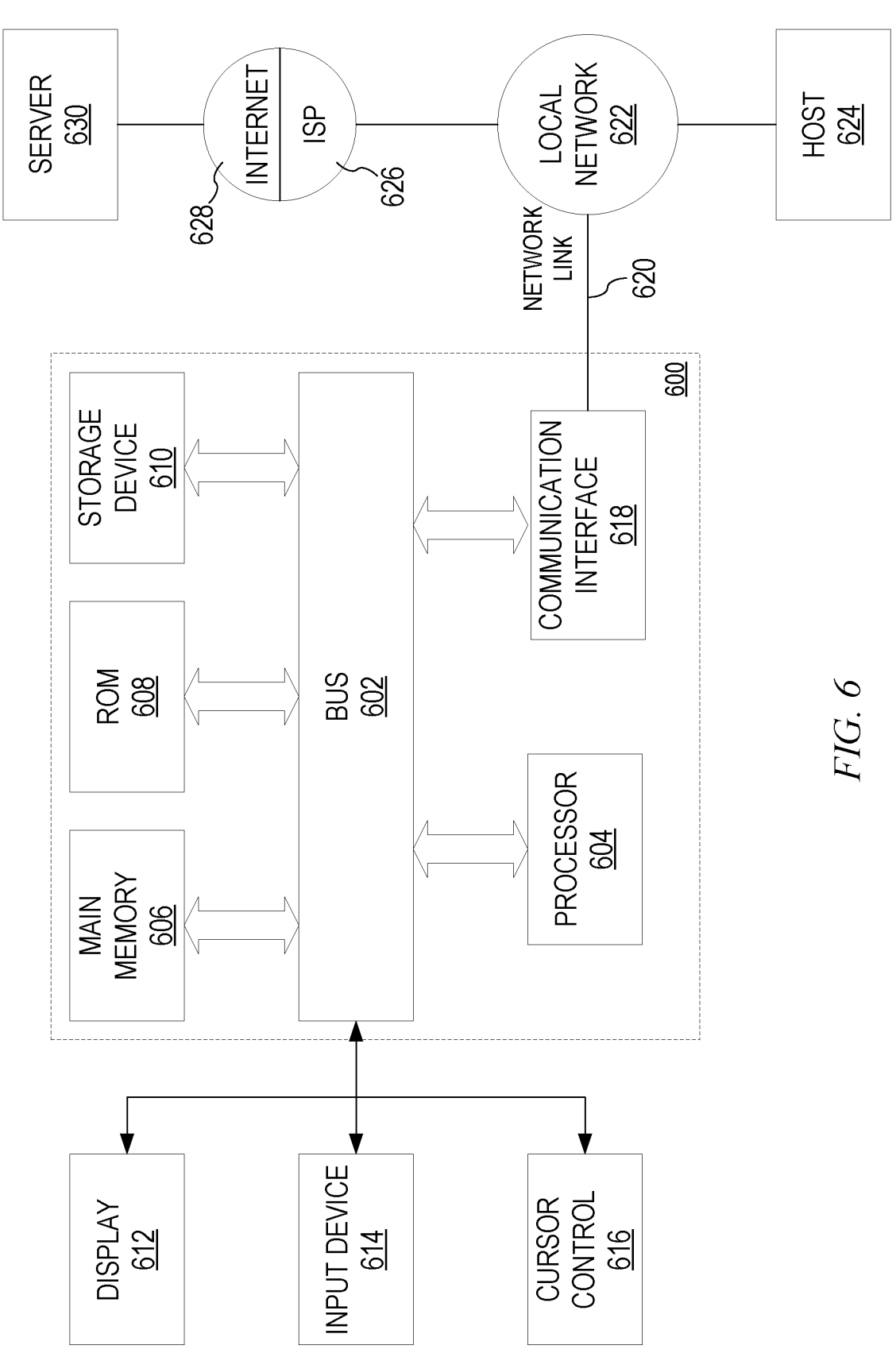
FIG. 6 is a block diagram that illustrates a computer system upon which an embodiment of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or solid-state drive is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media may also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer may load the instructions into its dynamic memory and send the instructions over a telephone line using a modem. A modem local to computer system 600 may receive the data on the telephone line and use an infra-red transmitter to convert the data to an infra-red signal. An infra-red detector may receive the data carried in the infra-red signal and appropriate circuitry may place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 may send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

Software Overview

Figure 7:
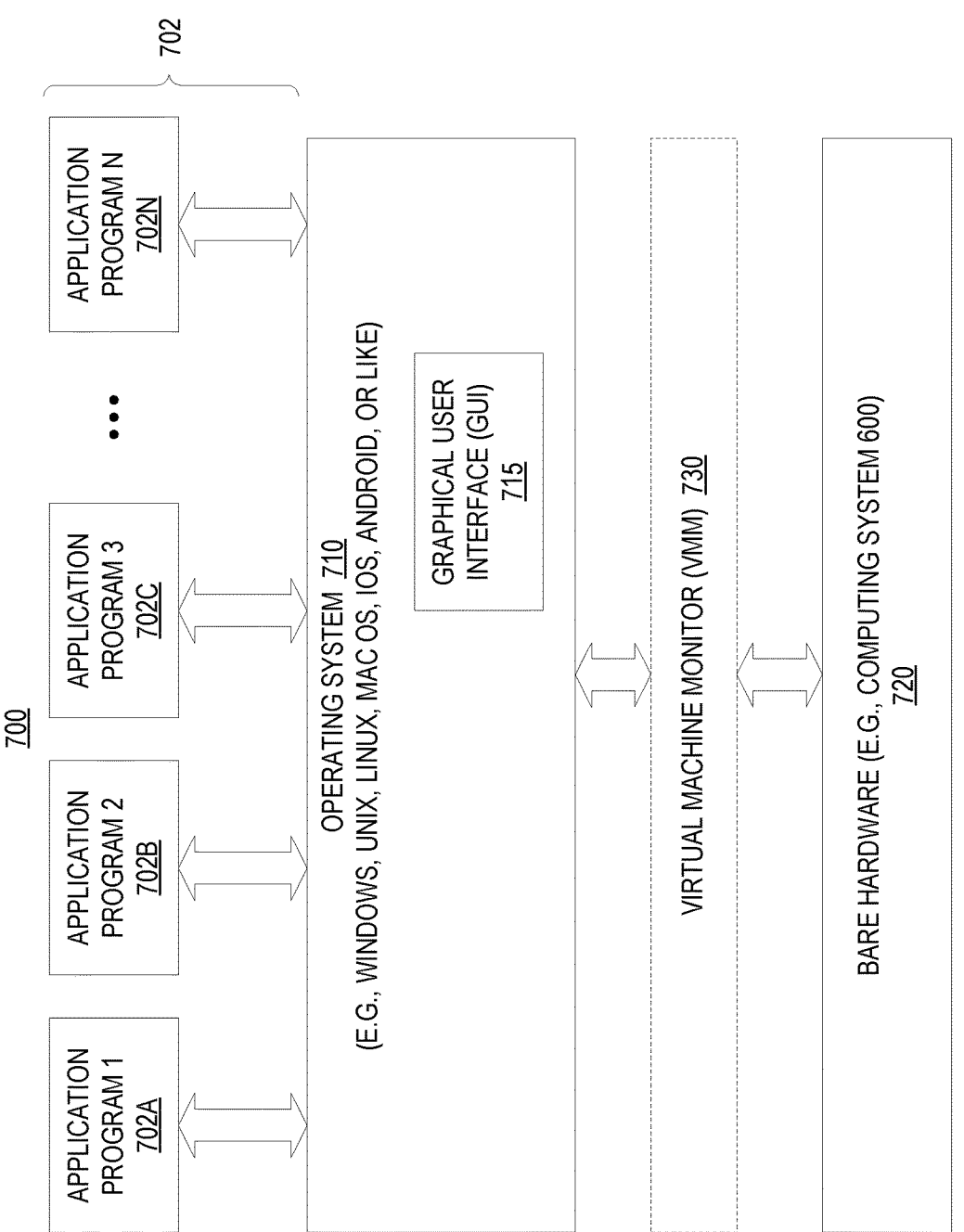
FIG. 7 is a block diagram of a basic software system that may be employed for controlling the operation of a computer system.

FIG. 7 is a block diagram of a basic software system 700 that may be employed for controlling the operation of computer system 600. Software system 700 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 700 is provided for directing the operation of computer system 600. Software system 700, which may be stored in system memory (RAM) 606 and on fixed storage (e.g., hard disk or flash memory) 610, includes a kernel or operating system (OS) 710.

The OS 710 manages low-level aspects of computer operation, including managing execution of processes, memory allocation, file input and output (I/O), and device I/O. One or more application programs, represented as 702A, 702B, 702C . . . 702N, may be "loaded" (e.g., transferred from fixed storage 610 into memory 606) for execution by the system 700. The applications or other software intended for use on computer system 600 may also be stored as a set of downloadable computer-executable instructions, for example, for downloading and installation from an Internet location (e.g., a Web server, an app store, or other online service).

Software system 700 includes a graphical user interface (GUI) 715, for receiving user commands and data in a graphical (e.g., "point-and-click" or "touch gesture") fashion. These inputs, in turn, may be acted upon by the system 700 in accordance with instructions from operating system 710 and/or application(s) 702. The GUI 715 also serves to display the results of operation from the OS 710 and application(s) 702, whereupon the user may supply additional inputs or terminate the session (e.g., log off).

OS 710 may execute directly on the bare hardware 720 (e.g., processor(s) 604) of computer system 600. Alternatively, a hypervisor or virtual machine monitor (VMM) 730 may be interposed between the bare hardware 720 and the OS 710. In this configuration, VMM 730 acts as a software "cushion" or virtualization layer between the OS 710 and the bare hardware 720 of the computer system 600.

VMM 730 instantiates and runs one or more virtual machine instances ("guest machines"). Each guest machine comprises a "guest" operating system, such as OS 710, and one or more applications, such as application(s) 702, designed to execute on the guest operating system. The VMM 730 presents the guest operating systems with a virtual operating platform and manages the execution of the guest operating systems.

In some instances, the VMM 730 may allow a guest operating system to run as if it is running on the bare hardware 720 of computer system 600 directly. In these instances, the same version of the guest operating system configured to execute on the bare hardware 720 directly may also execute on VMM 730 without modification or reconfiguration. In other words, VMM 730 may provide full hardware and CPU virtualization to a guest operating system in some instances.

In other instances, a guest operating system may be specially designed or configured to execute on VMM 730 for efficiency. In these instances, the guest operating system is "aware" that it executes on a virtual machine monitor. In other words, VMM 730 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

The above-described basic computer hardware and software is presented for purposes of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

What is claimed is:

1. A method comprising:
   generating user interface component metadata representing a user interface based at least in part on a metadata document, the metadata document comprising metadata specifying a plurality of fields of the user interface, and one or more dependencies of one or more of the plurality of fields on one or more other of the plurality of fields, wherein the one or more dependencies are declaratively specified in the metadata document via one or more dependency clauses identifying parent and child fields, and the user interface component metadata comprising metadata representing a first field of the plurality of fields;
   detecting an interaction with the first field in the user interface;
   responsive to detecting the interaction, identifying a second field of the plurality of fields having a dependency on the first field based at least in part on the one or more dependency clauses in the metadata document, wherein the dependency specifies at least one of whether the second field is presented in the user interface based on the interaction with the first field, or a set of one or more acceptable values for the second field based on the interaction with the first field; and
   updating the user interface component metadata to comprise data representing the second field, wherein the method is performed by one or more computing devices.

2. The method of claim 1, wherein the interaction with the first field of the user interface is a first interaction and the dependency is a first dependency, the method further comprising:
   detecting a second interaction with the second field, the second interaction indicating a particular value for the second field;
   identifying a third field of the plurality of fields having a second dependency on the second field based at least in part on the metadata document, the second dependency specifying the particular value; and
   updating the user interface to comprise the third field and data corresponding to the third field.

3. The method of claim 2, further comprising determining that the second dependency specifies the particular value based at least in part on a query to a third-party service.

4. The method of claim 2, further comprising:
   requesting the data corresponding to the third field from a third-party service; and receiving the data corresponding to the third field from the third-party service.

5. The method of claim 2, wherein encoding for rendering the user interface based at least in part on the metadata document further comprises determining to refrain from encoding for rendering the second field in the user interface based at least in part on the first dependency on the first field.

6. A method comprising:
   generating user interface component metadata representing a user interface based at least in part on a metadata document, the metadata document comprising metadata specifying a plurality of fields and one or more dependencies of one or more of the plurality of fields on one or more other of the plurality of fields, and the user interface component metadata comprising metadata representing a first field of the plurality of fields;

detecting an interaction with the first field in the user interface, wherein the user interface is a first user interface;

identifying a second field of the plurality of fields having a dependency on the first field based at least in part on the metadata document;

updating the user interface component metadata to comprise data representing the second field;

encoding for rendering a second user interface comprising an editable representation of the metadata document; and updating the second user interface to comprise an indication of one or more errors within the metadata document based at least in part on one or more rules, wherein the method is performed by one or more computing devices.

7. The method of claim 6, wherein the second user interface is encoded for rendering in response to determining that the metadata document satisfies the one or more rules.

8. The method of claim 6, wherein the one or more rules comprise at least one of:

one or more syntactic rules, one or more semantic rules, or one or more dependency rules.

9. The method of claim 6, further comprising updating the second user interface to comprise a representation of at least a portion of the first user interface.

10. One or more non-transitory, computer-readable media storing instructions which, when executed by one or more computing devices, cause:

generating user interface component metadata representing a user interface based at least in part on a metadata document, the metadata document comprising metadata specifying a plurality of fields of the user interface, and one or more dependencies of one or more of the plurality of fields on one or more other of the plurality of fields, wherein the dependencies are declaratively specified in the metadata document via dependency clauses identifying parent and child fields, and the user interface component metadata comprising metadata representing a first field of the plurality of fields;

detecting an interaction with the first field in the user interface;

responsive to detecting the interaction, identifying a second field of the plurality of fields having a dependency on the first field based at least in part on the dependency clauses in the metadata document, wherein the dependency specifies at least one of whether the second field is presented in the user interface based on the interaction with the first field, or a set of one or more acceptable values for the second field based on the interaction with the first field; and updating the user interface component metadata to comprise data representing the second field.

11. The one or more non-transitory, computer-readable media of claim 10, wherein the interaction with the first field of the user interface is a first interaction and the dependency is a first dependency, and the instructions, when executed by the one or more computing devices, further cause:

detecting a second interaction with the second field, the second interaction indicating a particular value for the second field;

identifying a third field of the plurality of fields having a second dependency on the second field based at least in part on the metadata document, the second dependency specifying the particular value; and updating the user interface to comprise the third field and data corresponding to the third field.

12. The one or more non-transitory, computer-readable media of claim 11, wherein the instructions, when executed by the one or more computing devices, further cause determining that the second dependency specifies the particular value based at least in part on a query to a third-party service.

13. The one or more non-transitory, computer-readable media of claim 11, wherein the instructions, when executed by the one or more computing devices, further cause:

requesting the data corresponding to the third field from a third-party service; and receiving the data corresponding to the third field from the third-party service.

14. The one or more non-transitory, computer-readable media of claim 11, wherein the instructions causing encoding for rendering the user interface based at least in part on the metadata document, when executed by the one or more computing devices, further cause determining to refrain from encoding for rendering the second field in the user interface based at least in part on the first dependency on the first field.

15. One or more non-transitory, computer-readable media storing instructions which, when executed by one or more computing devices, cause:

generating user interface component metadata representing a user interface based at least in part on a metadata document, the metadata document comprising metadata specifying a plurality of fields and one or more dependencies of one or more of the plurality of fields on one or more other of the plurality of fields, and the user interface component metadata comprising metadata representing a first field of the plurality of fields;

detecting an interaction with the first field in the user interface, wherein the user interface is a first user interface;

identifying a second field of the plurality of fields having a dependency on the first field based at least in part on the metadata document; and updating the user interface component metadata to comprise data representing the second field;

encoding for rendering a second user interface comprising an editable representation of the metadata document; and updating the second user interface to comprise an indication of one or more errors within the metadata document based at least in part on one or more rules.

16. The one or more non-transitory, computer-readable media of claim 15, wherein the second user interface is encoded for rendering in response to determining that the metadata document satisfies the one or more rules.

17. The one or more non-transitory, computer-readable media of claim 15, wherein the one or more rules comprise at least one of: one or more syntactic rules, one or more semantic rules, or one or more dependency rules.

18. The one or more non-transitory, computer-readable media of claim 15, wherein the instructions, when executed by the one or more computing devices, further cause updating the second user interface to comprise a representation of at least a portion of the first user interface.

19. The method of claim 1, further comprising:

determining whether the interaction comprises a first selection involving a static value, wherein the static value is a predetermined value specified in an array of dependency values in a dependency clause of the one or more dependency clauses;

responsive to the interaction comprising the first selection involving the static value, modifying the user interface based on the first selection involving the static value;

determining whether the interaction comprises a second selection involving a dynamic value, wherein the dynamic value is a value returned by the execution of a flow associated with a parent field;

responsive to the interaction comprising the second selection involving the dynamic value, requesting the dynamic value from a runtime engine.

20. The one or more non-transitory, computer-readable media of claim 10, wherein the instructions further cause:

determining whether the interaction comprises a first selection involving a static value, wherein the static value is a predetermined value specified in an array of dependency values in a dependency clause of the one or more dependency clauses;

responsive to the interaction comprising the first selection involving the static value, modifying the user interface based on the first selection involving the static value;

determining whether the interaction comprises a second selection involving a dynamic value, wherein the dynamic value is a value returned by the execution of a flow associated with a parent field;

responsive to the interaction comprising the second selection involving the dynamic value, requesting the dynamic value from a runtime engine.

* * * * *